`US007226089B2`

United States Patent
Wilkinson, III

(10) Patent No.: US 7,226,089 B2
(45) Date of Patent: Jun. 5, 2007

(54) JACKETED PIPE FLANGE

(76) Inventor: Joseph Wilkinson, III, 632 County Rd. 903, Brazoria, TX (US) 77422-0344

( * ) Notice: Subject to any disclaimer, the term of this patent is extended or adjusted under 35 U.S.C. 154(b) by 68 days.

(21) Appl. No.: 10/945,606

(22) Filed: Sep. 21, 2004

(65) Prior Publication Data
US 2006/0061102 A1   Mar. 23, 2006

(51) Int. Cl.
*F16L 3/00* (2006.01)
(52) U.S. Cl. ............... 285/123.15; 285/123.1; 285/124.1
(58) Field of Classification Search ............ 285/123.3, 285/368, 47, 123.1, 124.1, 405, 120.1, 123.2, 285/416, 124.3, 124, 123.15
See application file for complete search history.

(56) References Cited

U.S. PATENT DOCUMENTS 3,485,516 A * 12/1969 Hans et al. ............... 285/123.1
6,848,720 B2 * 2/2005 Carns et al. ............ 285/123.15

* cited by examiner

*Primary Examiner*—Aaron Dunwoody
(74) *Attorney, Agent, or Firm*—Browning Bushman P.C.

(57) ABSTRACT

A jacketed pipe flange (10) for connection to an end of an inner pipe (12) and to an end of a jacketed outer pipe (14) surrounding the inner pipe includes a central throughport (16) for mating with the inner pipe. The first annular sealing surface (18) surrounds a central throughport for sealing fluid within the inner pipe, a second annular sealing surface (20) surrounds the first sealing surface, and a third annular sealing surface (22) surrounds the second annular sealing surface for sealing fluid in the jacketed outer pipe from the exterior of the flange. An annular gap (24) separates the first and second sealing surfaces, and a test port (26) fluidly connects the annular gap with an exterior port in the flange. A plurality of axially extending throughports (34) in the flange between the second and third sealing surfaces pass fluid through the jacketed outer pipe and the flange to downstream components.

20 Claims, 2 Drawing Sheets

JACKETED PIPE FLANGE

FIELD OF THE INVENTION

The present invention relates to a jacketed pipe flange of the type useful for connecting to an inner pipe and a jacketed outer pipe surrounding the inner pipe. More particularly, the jacketed pipe flange includes a plurality of sealing surfaces and the plurality of throughports between the intermediate and the outer sealing surfaces for passing fluid through the jacketed outer pipe.

BACKGROUND OF THE INVENTION

The jacketed pipe is commonly used in the petrochemical and hydrocarbon refining industry. The inner pipe is surrounded by the outer pipe, thereby creating two separate flow compartments. The inner pipe, which is also referred to as the core pipe, is commonly used to transfer a product, while the outer pipe, commonly referred to as a shell, transfers a heating media, such as condensate, steam, or other products which transfer heat to the product in the core pipe.

With a traditional design of a jacketed pipe, the heating media bypasses the flanges through a smaller line, referred to as a jumper line, which connects the shell pipe on opposing sides of the flanges. This jumper line creates significant problems, including loss of heat at the flanges, significantly reduced flow rates through the shell pipe, exposure to damage, and insulation sealing of the shell pipe and the jumper which commonly results in separation and disrepair, causing additional loss of heat.

Another use for the jacketed pipe design is to detect internal leaks when transferring hazardous chemicals, such as cyanide or phosgene. The jacketed pipe lines that transfer hazardous chemicals commonly have two gasket seating surfaces, and cannot pin point a gasket breach. Typically, the core pipe and the shell pipe are similar to that described above, with the core pipe carrying the hazardous chemical while inert gas flows and through the shell pipe and through tiny holes in the flange and between the gasket surfaces. Flanges are typically provided at intervals of 20 feet through 100 feet for straight run pipe. Flanges are also provided at valves and fittings. At a select distance, which could be 300 feet or a 1000 feet, the tiny holes through the flange are commonly provided on one side of mating flanges and are discontinued on the other side. This allows for sectioning off the piping system, with a test unit provided at the end of each pipe section. Monitors are conventionally used at the exit port to detect internal gasket leaks and core pipe fractures. When a core pipe leak is detected in a particular section of piping, the system cannot determine if the problem is a core pipe fracture or a internal gasket leak. Because of the rareness of core pipe fractures, gaskets are commonly addressed first. The core pipe is decommissioned and all gaskets are replaced. The core pipe is then tested, and if the gasket leak has not been corrected, the process is repeated until satisfactory test occurs and the piping system can be returned to service.

The disadvantages of the prior art are overcome by the present invention, and an improved jacketed pipe flange suitable for both heating applications and the transfer of hazardous materials through the inner pipe is hereinafter disclosed.

SUMMARY OF THE INVENTION

A jacketed pipe flange is provided for connection to an end of an inner pipe and an end of a jacketed outer pipe surrounding the inner pipe. In one embodiment, the pipe flange includes a central throughport for mating with the end of the inner pipe, a first annular sealing surface surrounding the central throughport for sealing fluid within the inner pipe, a second annular sealing surface surrounding the first annular sealing surface, and a third annular sealing surface surrounding the second annual sealing surface for sealing fluid in the jacketed outer pipe from the exterior of the flange. An annular gap separates the first and second sealing surfaces, and a test port fluidly connects the annular gap with an exterior port in the flange. A plurality of axially extending throughports in the flange spaced between the second and third sealing surfaces allow fluid in the jacketed outer pipe to pass through the plurality of throughports. In one embodiment, the jacketed outer pipe passes a heated fluid through the outer pipe to heat the inner pipe, while in another embodiment the jacketed outer pipe contains an inert gas.

In a preferred embodiment, a pair of alignment nipples which act as stops are each positioned within and extend axially from a selected throughport, such that the inner seal rests on the nipples to center the inner seal on the first and second sealing surfaces.

A significant feature of the jacketed pipe flange is that the risks associated with the jumper line around the flange are avoided. High flow rates are maintained through the mating flanges, and misalignment of mating flanges is overcome. A related feature of the invention is that various sensors and detectors may be used for accurately detecting the precise location of a leak past the first sealing surface which seals fluid within the inner pipe.

These and further features and advantages of this invention will become apparent from the following detailed description, wherein reference is made to the figures in the accompanying drawings.

DETAILED DESCRIPTION OF THE PREFERRED EMBODIMENTS

Figure 1:
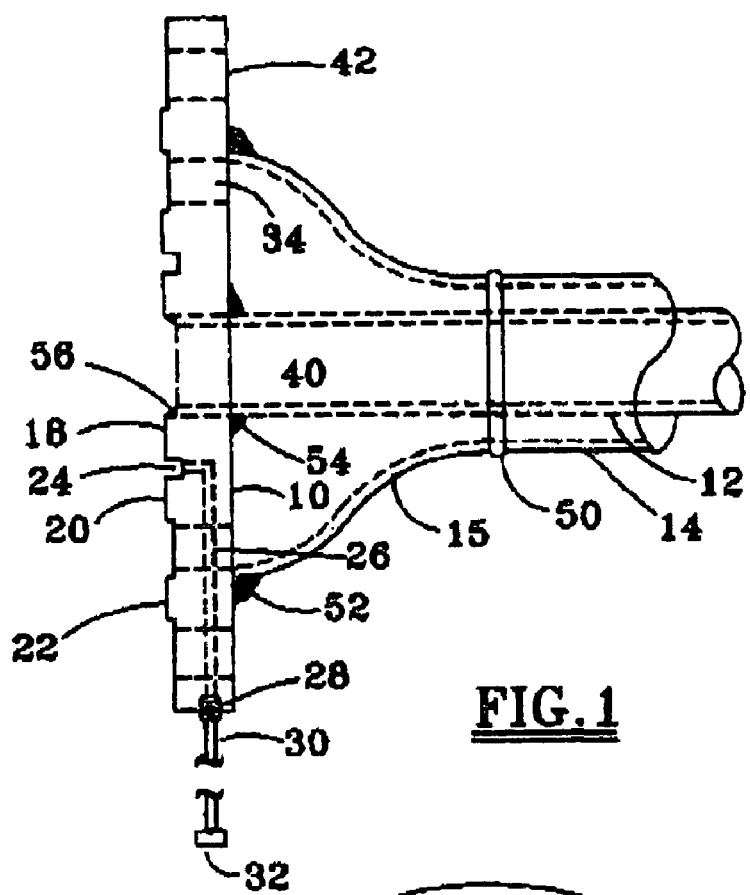
FIG. 1 is a side view of a suitable jacketed pipe flange weldably connected to an inner pipe and an outer pipe.
Figure 2:
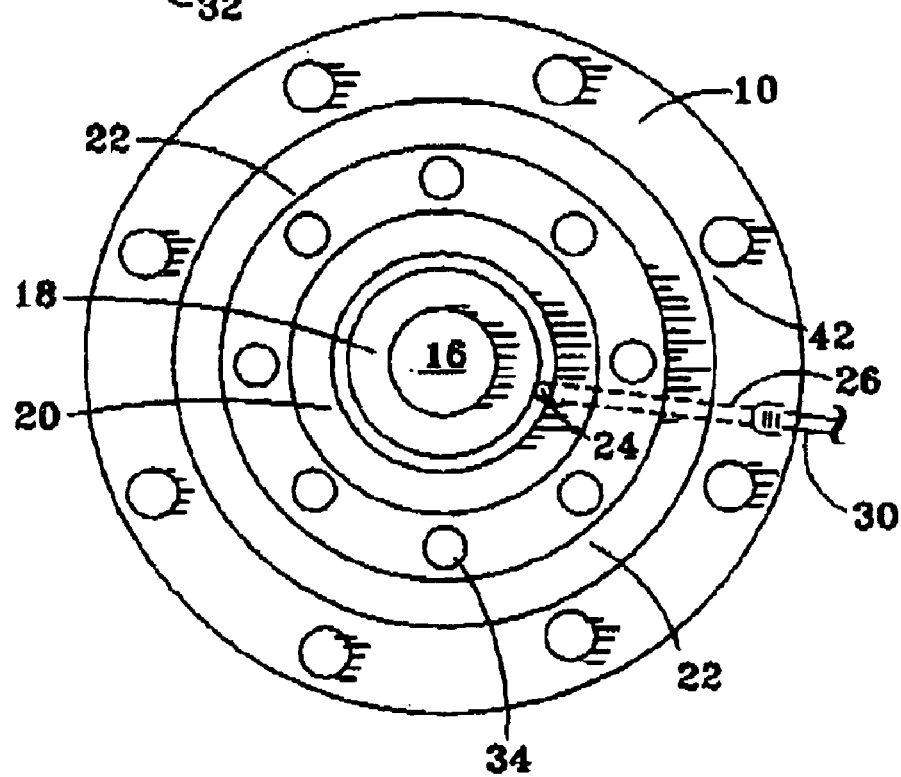
FIG. 2 is a front view of a flange as shown in FIG. 1.

FIG. 1 illustrates one embodiment of a pipe flange 10 according to the present invention for passing fluid from an inner pipe 12 to the continuation of the pipe 12 secured to a mating flange, and similarly for passing fluid in the annulus between the inner pipe 12 and the outer pipe 14 to the annulus to a continuation of pipes 12 and 14 secured to a mating flange. The outer pipe 14 is connected to the bell portion 15 at annular weld 50, and is welded to the flange 10 at annular weld 52. The inner pipe 12 may be similarly welded to the flange 10 at welds 54 and 56.

The flange 10 includes a central throughport 16 for mating with an end of the inner pipe 12 to pass fluid from the inner pipe 12 through the port 16 in the flange 10. An annular sealing surface 18 surrounds the central throughport 16 for sealing fluid within the inner pipe 12. A second annular sealing surface 20 surrounds the first annular sealing surface 18, with an annular gap 24 separating the first and second sealing surfaces. The annular gap 24 is fluidly connected to test port 26, which extends to the exterior of the flange 10. Port 28 may thus be in communication with the annular gap 24, and a conventional fluid line 30 may interconnect by threading or welding to port 28 and to any number of suitable fluid sensors or testers 32 for sensing the leakage of fluid past the sealing surface 18. The third annular sealing surface 22 surrounds the second annular sealing surface, and seals fluid in the jacketed outer pipe from an exterior of the flange. A plurality of axially extending throughports 34 in the flange between the second and third sealing surfaces are provided, so that fluid in the jacketed outer pipe passes through the plurality of throughports 34 in the flange 10, and through similar throughports in the mating flange, and then to the annulus between an inner and outer pipe in an adjoining section.

In one embodiment, the jacketed outer pipe passes a heating fluid, such as steam, through the outer pipe to heat the inner pipe. For this application, the cross sectional flow area of the plurality of ports 34 is at least 70% of the cross-sectional flow area between an outside of the inner pipe 12 and the inside of the outer pipe 14, and in many applications will be at least 90% of the cross-sectional flow area between the inner and outer pipes. The ports 34 thus do not substantially restrict the flow of heated fluid through the flange, thereby providing highly effective heating of the inner pipe. The outer pipe 14 may thus include an exterior insulation layer to minimize heat losses.

In another embodiment, the inner pipe may contain a hazardous gas, in which case the jacketed outer pipe 14 may contain an inert gas. For this application, inert gas may continue to pass throughports 34, but the quantity of inert gas flowing in the annulus is not as important as it is for the heating application. Accordingly, the diameter and/or number of ports 34 in the flange may be reduced for this application, so that the overall size of the bell 15 may be reduced. As an alternative to using inert gas, the outer pipe 14 may be free of gas, so that leakage of pressured gas from the inner pipe to the outer pipe may be detected by monitoring gas makeup in the outer pipe.

Figure 3:
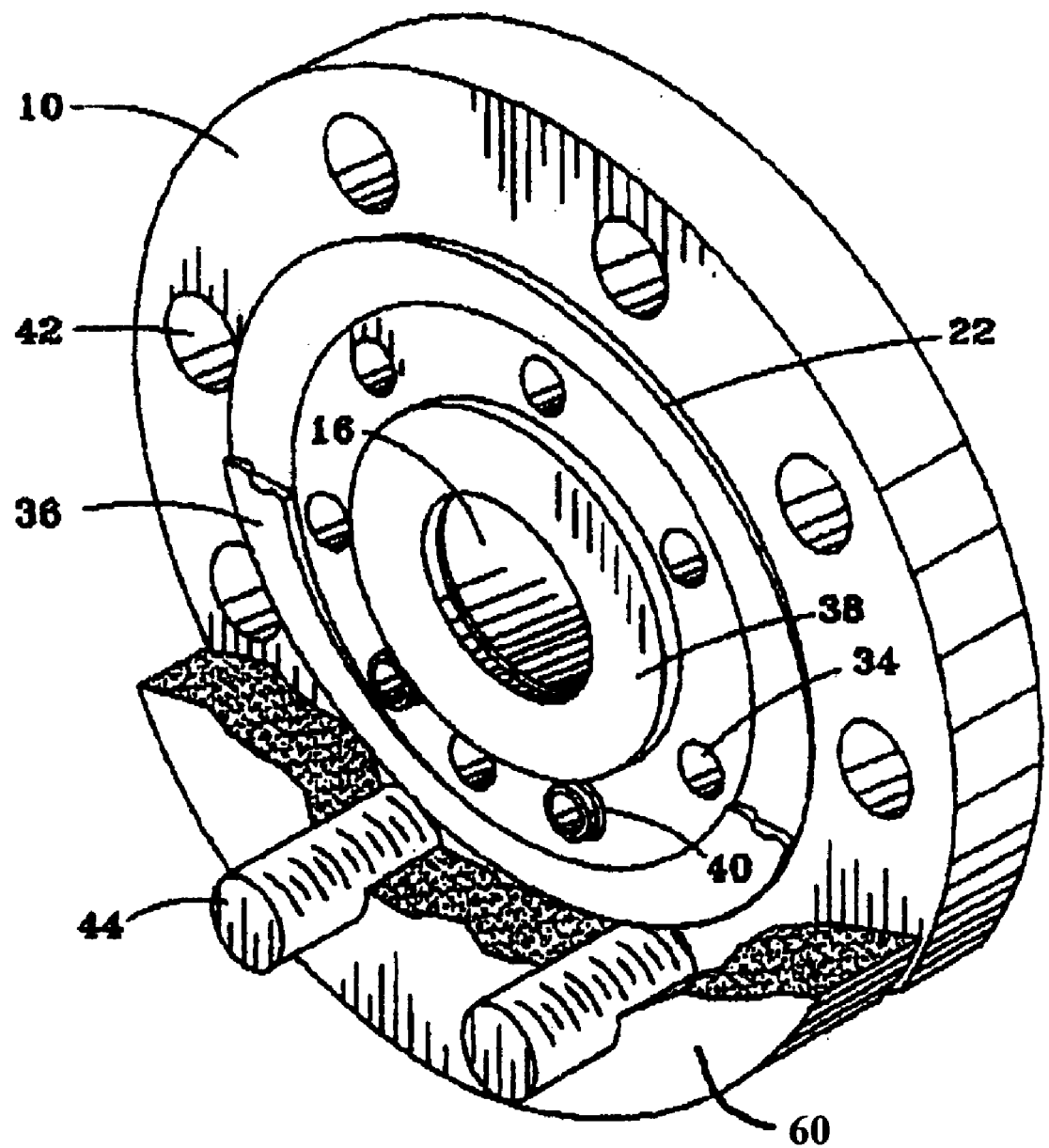
FIG. 3 is a pictorial view illustrating the inner seal and the outer seal for sealing with both the flange and a mating flange.

As shown in FIG. 3, an outer annular seal 36, which is substantially a flat plate seal, seals with the third seating surface 22 and with a mating third sealing surface on a mating flange 60. During assembly of the flange, two temporary alignment pins 44 may be positioned within the lower bolt holes 42 in the flange and the mating flange, and the outer annular seal lowered between a gap between the flanges until the outer seal rests on the pair of lower temporary alignment pins 44, thereby centering the flat plate seal 36 on the third sealing surface. An inner annular seal 38 is also provided for sealing with the first sealing surface and with a mating first sealing surface on the mating flange, and also with the second sealing surface and with a mating second sealing surface on the mating flange. The inner seal 38 thus may extend over the annular gap 24 between the surfaces 18 and 20. In order to position the inner seal on the surfaces 18 and 20, a pair of previously installed alignment stops 40 as shown in FIG. 3 have each been positioned within and extend from two selected throughports 34. The stops 40 may thus remain in place when the flange is mated to another flange. The extension of the stops from the throughports 34 allows the inner seal to engage and rest on the pair of stops to be positioned on the seal surfaces 18 and 20. In a preferred embodiment, stops 40 may be in the form of nipples having flow through paths for transmitting fluid through the stops, and through the other throughports 34 which do not have stops. Each nipple 40 may have a central exterior annular ridge for serving as a stop surface to limit insertion of the nipple into a selected port 34, and the annular ridge may be engaged by the inner gasket or seal 38 to center the seal on the flange. In addition, the flange and all other openings in the mating flanges achieve desired alignment by the pair of nipples. The pins 44 may be removed and replaced with flange bolts without allowing radial movement of the outer seal 36 with respect to the third sealing surface. The nipples 40 remain in place while the flange bolts are tightened.

In preferred embodiments, each sealing surface 18, 20 and 22 is a planar surface positioned within a plane substantially perpendicular to a central axis of the flange. Also, each sealing surface has a minimum radial width of at least $\frac{3}{8}$ inch, and preferably $\frac{1}{2}$ inch or greater. The surfaces 18 and 20 are preferably in the same plane, the surface 22 may be spaced slightly closer to the bell 15 than the surfaces 18 and 20 to ensure reliable sealing of the gasket with surface 18 and 20 before sealing the outer gasket with surface 22, thereby ensuring that the gaskets will reliably seal with all three surfaces when the flanges are fully mated. The slight axial spacing of surface 22 may be accomplished by controlling the welding operation when securing the bell to the flange. The radially outer portion of the flange and thus the outside sealing surface 22 thus flex slightly back toward the shell pipe as a result of the welding operation. The flex is overcome when tightening flange bolts to seal the interior and the outside gaskets.

The flange may also include a port in fluid communication with the annulus between the interior pipe and the shell pipe, with this port extending to an exterior surface of the flange for connection to a test unit. This will allow monitoring of the integrity of the inner pipe separate from the sealing integrity of the flanges.

According to the method of the invention, the flange is provided with a central throughport 16 as a disclosed herein for mating with an end of an inner pipe. Fluid is sealed within the inner pipe with a first annular sealing surface surrounding the central throughport, with a second annular sealing surface surrounding the first annular sealing surface. Fluid is sealed in the jacketed outer pipe from an exterior by the annular sealing surface 22 surrounding the second annular sealing surface. An annular gap is provided for separating the first and second sealing surfaces. The annular gap is fluidly interconnected with an exterior port in the flange in order to test for leakage past the sealing surface 18. A plurality of axially extending throughports in the flange between the second and third sealing surfaces are provided so that fluid in the jacketed outer pipe passes through the plurality of throughports. The jacketed outer pipe may pass the heated fluid through the outer pipe to heat the inner pipe, or may contain an inert gas. A pair of stops are positioned within and extend axially from the selected throughport, such that inner seal rests on the stops to center the inner seal on the first and second sealing surfaces.

The foregoing disclosure and description of the invention is illustrative and explanatory of preferred embodiments. It would be appreciated by those skilled in the art that various changes in the size, shape of materials, as well in the details of the illustrated construction or combination of features discussed herein maybe made without departing from the spirit of the invention, which is defined by the following claims.

The invention claimed is:

1. A jacketed pipe flange for connection to an end of an inner pipe and to an end of a jacketed outer pipe surrounding the inner pipe and for sealing with a mating surface on another flange, the pipe flange comprising:
   a central throughport for mating with the end of the inner pipe;
   a first annular sealing surface surrounding the central throughport for sealing with the mating surface on the another flange to seal fluid within the inner pipe;
   a second annular sealing surface surrounding the first annular sealing surface for sealing with the mating surface on the another flange;
   a third annular sealing surface surrounding the second annular sealing surface for sealing with the mating surface on the another flange to seal fluid in the jacketed outer pipe from an exterior of the flange;
   an annular gap separating the first and second sealing surfaces;
   an inner annular seal sealing with the first sealing surface and with the mating surface on the another flange, and sealing with the second sealing surface and with the mating sealing surface on the another flange;
   a plurality of axially extending throughports in the flange between the second and the third sealing surfaces, such that fluid in the jacketed outer pipe passes through the plurality of throughports; and
   a pair of alignment stops each for positioning within and extending axially from a selected throughport, such that the inner annular seal rests on the stops to center the inner annular seal on the first and second sealing surfaces.

2. A jacketed pipe flange as defined in claim 1, further comprising:
   a test port fluidly interconnecting the annular gap with an exterior port in the flange.

3. A jacketed pipe flange as defined in claim 1, wherein the jacketed outer pipe passes a heated fluid through the outer pipe to heat the inner pipe.

4. A jacketed pipe flange as defined in claim 1, wherein a cross sectional flow area through the plurality of throughports is at least 70% of the cross sectional flow area between an outside of the inner pipe and an inside of the outer pipe.

5. A jacketed pipe flange as defined in claim 1, wherein the jacketed outer pipe contains an inert gas.

6. A jacketed pipe flange as defined in claim 1, further comprising:
   an outer annular seal sealing with the third sealing surface and with a mating third sealing surface on a mating flange.

7. A jacketed pipe flange as defined in claim 1, wherein each of the alignment stops is a nipple with a flow path through the nipple.

8. A jacketed pipe flange as defined in claim 1, wherein each sealing surface is a planar surface positioned within a plane substantially perpendicular to a central axis of the flange.

9. A jacketed pipe flange as defined in claim 8, wherein each sealing surface has a minimum radial width of at least $\frac{3}{8}$ inch.

10. A jacketed pipe flange as defined in claim 1, further comprising:
   a plurality of bolt holes each radially outward of the third sealing surface for receiving a respective plurality of bolts.

11. A jacketed pipe flange for connection to an end of an inner pipe and an end of a jacketed outer pipe surrounding the inner pipe and for sealing with a mating surface on another flange, the pipe flange comprising:
   a central throughport for mating with the end of the inner pipe;
   a first annular sealing surface surrounding the central throughport for sealing fluid within the inner pipe;
   a second annular sealing surface surrounding the first annular sealing surface;
   a third annular sealing surface surrounding the second annular sealing surface for sealing fluid in the jacketed outer pipe from an exterior of the flange;
   an annular gap separating the first and second sealing surfaces;
   a test port fluidly interconnecting the annular gap with an exterior port in the flange;
   a plurality of axially extending throughports in the flange between the second and the third sealing surfaces, such that fluid in the jacketed outer pipe passes through the plurality of throughports;
   an outer annular seal sealing with the third sealing surface and with the mating third sealing surface on the mating flange;
   an inner annular seal sealing between the first sealing surface and with the mating first sealing surface on the mating flange, and with the second sealing surface and with the mating second sealing surface on the mating flange; and
   a pair of alignment stops each for positioning within and extending axially from a selected throughport, such that the inner seal rests on the stops to center the inner seal on the first and second sealing surfaces.

12. A jacketed pipe flange as defined in claim 11, wherein a jacketed outer pipe passes a heated fluid through the outer pipe to heat the inner pipe.

13. A jacketed pipe flange as defined in claim 11, wherein each of the alignment stops is a nipple with a flow path through the nipple.

14. A jacketed pipe flange as defined in claim 11, wherein each sealing surface is a planar surface positioned within a plane substantially perpendicular to a central axis of the flange.

15. A jacketed pipe flange assembly for connection to an end of an inner pipe and to an end of a jacketed outer pipe surrounding the inner pipe and for sealing with a mating surface on another flange, the pipe flange assembly comprising:
   a pipe flange having central throughport for mating with the end of the inner pipe;
   a first annular sealing surface surrounding the central throughport for sealing with the mating surface on the another flange to seal fluid within the inner pipe;
   a second annular sealing surface surrounding the first annular sealing surface for sealing with the mating surface on the another flange;
   a third annular sealing surface surrounding the second annular sealing surface for sealing with the mating surface on the another flange to seal fluid in the jacketed outer pipe from an exterior of the flange;
   an annular gap separating the first and second sealing surfaces;
   an inner annular seal sealing with the first sealing surface and with the mating surface on the another flange, and sealing with the second sealing surface and with the mating sealing surface on the another flange;
   a plurality of axially extending throughports in the flange between the second and the third sealing surfaces, such that fluid in the jacketed outer pipe passes through the plurality of throughports;

a pair of alignment stops each for positioning within and extending axially from a selected throughport, such that the inner annular seal rests on the stops to center the inner annular seal on the first and second sealing surfaces; and an annular bell portion welded to the flange and to the jacketed outer pipe, an interior of the annular bell portion being in fluid communication with each of the one or more throughports and having a cross-sectional flow area of at least 70% of a cross-sectional flow area between an outside of the inner pipe and an inside of the outer pipe.

16. A jacketed pipe flange assembly as defined in claim 15, wherein each seating surface is a planar surface positioned within a plane substantially perpendicular to a central axis of the flange.

17. A jacketed pipe flange as defined in claim 15, further comprising:

an outer annular seal sealing with the third sealing surface and with a mating third sealing surface on a mating flange.

18. A jacketed pipe flange as defined in claim 15, wherein each of the alignment stops is a nipple with a flow path through the nipple.

19. A jacketed pipe flange as defined in claim 15, wherein each sealing surface is a planar surface positioned within a plane substantially perpendicular to a central axis of the flange.

20. A jacketed pipe flange as defined in claim 15, wherein a jacketed outer pipe passes a heated fluid through the outer pipe to heat the inner pipe.

* * * * *